Figure 1:
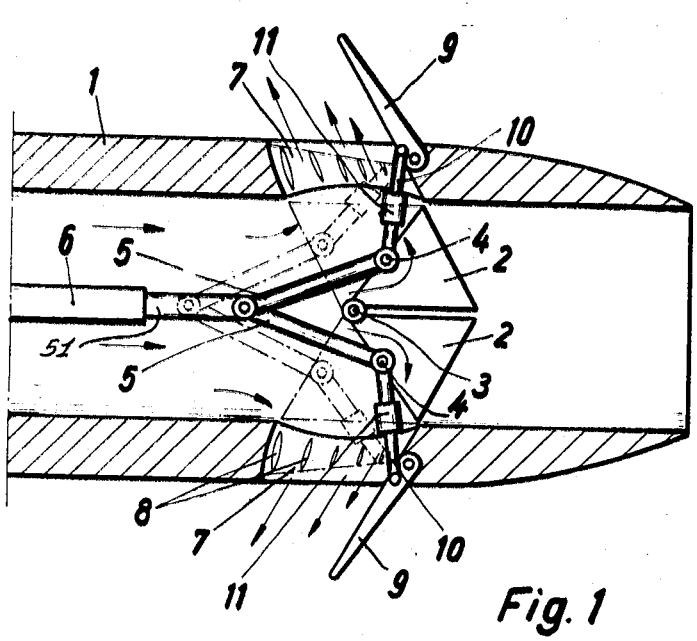

United States Patent [19]
Wolf et al.

[11] 3,734,411
[45] May 22, 1973

[54] AIR BRAKE FOR JETS

[75] Inventors: Konrad Wolf; Hermann Barmbold, both of Bremen, Germany

[73] Assignee: Vereinigte Flugtechnische Werke-Fokker GmbH, Bremen, Germany

[22] Filed: May 21, 1971

[21] Appl. No.: 145,780

[30] Foreign Application Priority Data

June 6, 1970 Germany.................P 20 27 882.4

[52] U.S. Cl.............................................239/265.29
[51] Int. Cl................................................B64c 15/04
[58] Field of Search....................239/265.27, 265.29, 239/265.31; 60/228, 229, 232

[56] References Cited

UNITED STATES PATENTS

| | | | |
|---|---|---|---|
| 2,886,946 | 5/1959 | Parker | 239/265.27 X |
| 3,068,646 | 12/1962 | Fletcher | 239/265.29 |
| 3,172,256 | 3/1965 | Kerry et al. | 60/229 |
| 3,248,878 | 5/1966 | Clark et al. | 60/229 |

FOREIGN PATENTS OR APPLICATIONS

| | | | |
|---|---|---|---|
| 745,720 | 2/1956 | Great Britain | 239/265.27 |
| 25,134 | 4/1963 | Germany | 239/265.27 |

*Primary Examiner*—M. Henson Wood, Jr.
*Assistant Examiner*—John J. Love
*Attorney*—Smyth, Roston & Pavitt

[57] ABSTRACT

Brake system for aircraft in cooperation with a thrust producing jet engine exhaust nozzle, using at least one thrust reversing deflector having selective position in the flow path of the nozzle for thrust reversal and for flow-through without thrust reversal, a flap is disposed and connected to the deflector to serve as jet flow guide vane, when extended, for the reversed stream of gases as resulting from thrust reversing position of the thrust reversing deflector. Additionally, the flap is independently extendible while the deflector remains in flow through position, to serve as air brake.

4 Claims, 2 Drawing Figures

Patented May 22, 1973

3,734,411

Inventors:
Konrad Wolf
Herman Barmbold

ATTORNEYS

AIR BRAKE FOR JETS

The present invention relates to air brakes for jet engines with jet-flow guides and thrust reversal equipment.

Air brakes are known in form of flaps which may be pivoted out and extended from the fuselage or wings of an aircraft. Such brakes are particularly effective for reducing high speeds of the aircraft when in flight. Jet planes are also provided with so-called thrust reversal, for slow-down and braking at lower speeds and particularly for shortening the distance the plane runs on the runway after landing. The thrust reversing devices are provided in the exhaust system of the jet engine and include particular deflectors that reverse the direction of thrust producing jet exhaust. In addition, jet flow guiding vanes may be extended from the engine pod, for guiding the deflected and reversed, thrust producing jet.

In order to obtain satisfactory braking conditions over the entire speed range of the aircraft, extendible air brake flaps, as well as thrust reversing equipment is usually provided in the same plane. In view of the necessary construction elements and material expenditure needed for such dual brake system, weight is added to the plane, and such duplication of brakes, each operable in one particular speed range only, cannot be regarded as an optimum solution.

Another braking equipment is known which operates also independently from friction contact with ground and is used particularly in jets with laterally arranged outlets. There are provided flaps having openings, and flow reversing vanes are disposed in the openings. When extended these flaps serve as air brakes, while the vanes provide thrust reversal when the flaps are folded back. It is apparent that this latter type of air brake is usable only in aircraft having jet discharge nozzles in the fuselage. Moreover, this kind of brake equipment has the essential disadvantage that the flaps themselves provide only limited braking due to the openings therein. Additionally, the thrust reversing vanes in the openings do not provide optimum reversal of the engine thrust because they guide the reversing flow over a very short distance only. Finally, this kind of brake has the disadvantage that the flaps are folded back into the fuselage when the vanes provide thrust reversal. Therefore, the air brake flaps will not be able to provide a supplementing braking effect when in this position.

The problem solved by the invention is to provide a brake system for aircraft that avoids the aforementioned disadvantages; is simpler in construction and saves weight. Moreover, such a braking equipment should be provided directly in the aircraft jet engine, and should include thrust-reversing deflectors and jet flow guiding vanes. In accordance with the preferred embodiment of the present invention, flaps serving as reversed jet flow guiding vanes are selectively extendible independently from position of thrust reversing deflectors, to obtain aerodynamic braking, concurring with or independent from thrust reversal. Preferably, this independent displacement of the jet guiding vanes is carried out by means of actuators which are connected to the actuation equipment of the thrust-reversal equipment. The advantages obtained with the present invention reside particularly in the fact that with relative little expenditure, a very effective air brake is provided. Furthermore, it is possible, to equip airplanes which already have a thrust-reversing device, additionally to provide a complimentary air brake.

Figure 2:
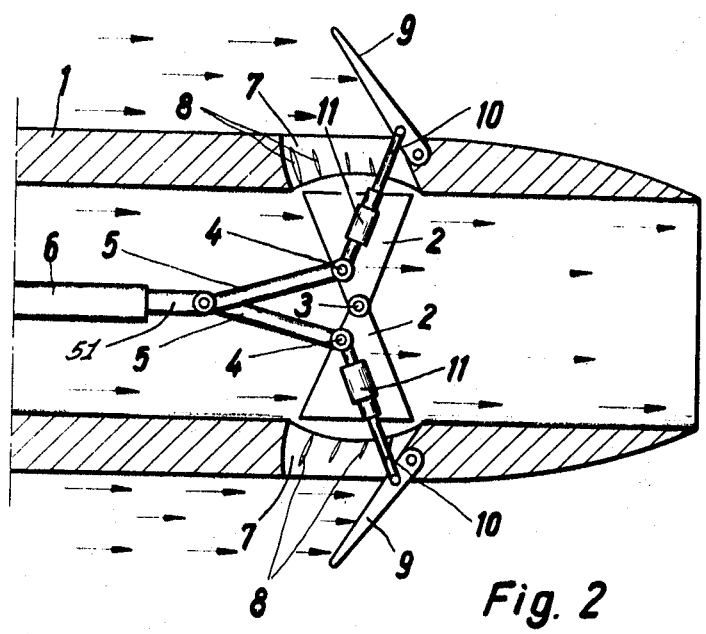

While the specification concludes with claims, particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a section view of a brake system with combined air brake and thrust-reversing equipment in accordance with the preferred embodiment of the invention and shown in operating position for thrust-reversal; and FIG. 2 is a similar section view of the same device but in operating condition to serve as air brake only.

Proceeding now to the detailed description of the drawings, there is provided a thrust producing, exhaust nozzle 1 of a jet engine flown through by propulsion gases in the direction of the arrows therein. Two deflector vanes or plates 2 are mounted for independent pivoting on a shaft 3. In FIG. 1, the two deflectors 2 are shown in deflecting, thrust reversing position. An alternative position of the deflectors is dash-dotted in FIG. 1, but fully drawn in FIG. 2. In the latter position, exhaust gases flow through the nozzle, substantially unimpeded by deflectors 2.

Actuator rods and linkage 5 are respectively articulated to the two thrust reversing deflectors at pivot points, so as to pivot the deflectors on the axis of shaft 3. The two actuating rods 5 are connected to control a rod 51, selectively protracted and retracted by a control and actuator 6.

The thrust nozzle 1 has exit openings or lateral outlets 7 which are provided within the range of effective operation of deflectors 2, which is to be understood in a two-fold manner. In thrust reverse position of FIG. 1, the deflectors 2 deflect the gases (jet flow) towards the openings 7; in flow-through position of FIG. 2, the deflectors cover these openings. Small stationary vanes 8 are provided in these outlets 7 to aid in the flow directioning. Flaps 9 serving as reversed-jet flow guiding vanes are pivotally connected and hinged in the wall of nozzle 1. FIG. 1 illustrates in dash-dot lines that these flaps or vanes 9 may close off the openings 7 completely. However, the vanes may also be extended and pivoted up to serve as air brakes with (FIG. 1) or without (FIG. 2) concurrent thrust reversal.

Flow guide vanes 9 are linked to the thrust deflectors 2 via variable length connections 10. Actuators 11 are interposed for selectively shortening or extending the connections 10. These actuators 11 operate individually to obtain a change in effective total length of the respective connections 10 using, e.g. pivot points 4 as reference. Upon extending the distance between pivot points 4 and the respective point of connection to flaps 9, the flaps 9 are pivoted out so as to obtain an aerodynamic brake effect, whereby the respective positions of deflectors 2 determine whether or not the flaps serve also as reversed flow guiding vanes.

Braking equipment as described operates as follows: Normally, i.e., in case of takeoff and regular flight, when neither air brake operation nor thrust-reversal is desired, thrust reversing deflectors 2 are in flow-through position of FIG. 2 (or as shown in dash-dot lines in FIG. 1) permitting essentially free passage of gas flow through the nozzle. Control rods 5 and 51 have position as shown in FIG. 2 or, by contrast, as shown in dash-dot lines in FIG. 1, the exit openings 7 are closed off by flaps or vanes 9, being folded down.

Now, it is assumed that thrust is to be reversed so that actuator 6 shifts rod and linkage 5, 51, from the dash-dot position in FIG. 1 to the fully drawn position whereupon deflectors 2 are pivoted into the path of gas flow through exhaust nozzle 1. In view of coupling deflectors 2 to flaps or vanes 9 by means of connectors 10, the flow guiding vanes 9 are pivoted up concurrently and will assume the position also shown in solid lines in FIG. 1. In this case, the actuators 11 do not provide any change in length of connections 10 so that these connections act as rigid linking rods. One can see that extended flaps or vanes 9 aid in the braking effect and provide supplementing aerodynamic braking, but primarily they provide guides for the reversed flow of gases as redirected by deflectors 2 toward the respective outlets 7.

The normal sequence of events is somewhat different and begins with braking during flight by aerodynamic braking without thrust-reversal. Deflectors 2 are to be maintained in a pass-through position, such as shown in FIG. 2, but flaps 9 are to be pivoted up to serve as air brakes. For this, actuators 11 extend the length of the respective connections 10 and operate the flaps or vanes 9, to lift them up into the air flow (see outer arrows of FIG. 2) so as to provide aerodynamic braking.

The flaps 9 remain extended, e.g. until after landing, when it is desirable to provide thrust-reversing without folding the flaps 9 back as now flaps 9 function as reversed flow guide vanes. It becomes necessary to operate actuators 6 and 11 concurrently; actuator 6 pivots the thrust reversing deflectors 2 from the position shown in FIG. 2 to position shown in FIG. 1, while vanes 9 maintain position due to concurrent shortening of connections 10 by operation of actuators 11.

The invention is not limited to the embodiments described above but all changes and modifications thereof not constituting departures from the spirit and scope of the invention are intended to be included.

I claim:

1. Brake system for aircraft in cooperation with a thrust producing jet engine exhaust nozzle, using at least one thrust reversing deflector having first selective position in the flow path of the nozzle for thrust reversal and flow direction through lateral opening of the nozzle and having second selective position for providing flow-through without thrust reversal while covering said opening, there being first means for changing the selective positions of the deflector, the improvement comprising, a flap disposed for covering said opening as well as for pivoting up to serve as selective, jet flow guide vane for the reversed stream of gases as resulting from the first, thrust reversing position of the thrust reversing deflectors;

second means coupled to said flap to pivot said flap and for operating for covering the opening or for pivoting the flap up to serve as air brake;

third means including the first and second means for selectively operating the first and second means (a) in immediate dependency to obtain flap covering for flow-through of the deflector and flap pivoting up for thrust reversal, and (b) for independent dispositions and change in dispositions of the flap and the deflector so as to operate the flap as air brake independently from the disposition and function of the deflector.

2. Brake system as in claim 1, comprising second means including linkage rigidly interconnecting deflector and flap to obtain change-over from flow-through to thrust reversal of the deflector with concurring extension of the flap to serve as reversed flow guide vane, the third means including an actuator in the rigid interconnection for changing the relative position thereof for extending the flap while the deflector remains in flow-through position.

3. Brake system for aircraft in cooperation with a thrust producing jet engine exhaust nozzle using a pair of hinged thrust reversing deflectors having first position in the flow path of the nozzle for thrust reversal and directing reversed flow through lateral openings in the nozzle, and second position for flow-through in the nozzle without thrust reversal while closing said openings, further having flaps respectively pivoted at the openings for selectively covering the openings or for extension into the external flow and as guide vanes for the reversed thrust, there being first means including actuator means linked to the deflectors for operating the deflectors to obtain selectively said first and second positions respectively for the production of reversed and forward thrust;

second means coupling the deflectors to the flaps to obtain extended and covering disposition of the flaps respectively when the deflector has first and second position, and varying the position of the flaps in direct dependency upon the operation of the first means, the improvement comprising, third means included in the second means for selectively pivoting the flaps from the covering to the extended position for air brake operation and while the first means hold the deflectors in the second flow-through position, and for maintaining the flaps in extended position when the deflectors are moved by the first means from the second, flow-through positions to assume the first position for thrust reversal.

4. Brake system as in claim 1, wherein the first means includes linkage coupled to the deflectors, and the second and third means includes linkage coupled to the linkage of the first means and to the flaps, the linkage of the second and third means including a hydraulic means for maintaining a connection between deflectors and flaps, when flaps and deflectors are operated in unison by the first means, and for varying the connection when the flaps are operated while the deflectors are maintained in the second position or are moved to the first position while the flaps are extended.

* * * * *